Patented Sept. 14, 1954

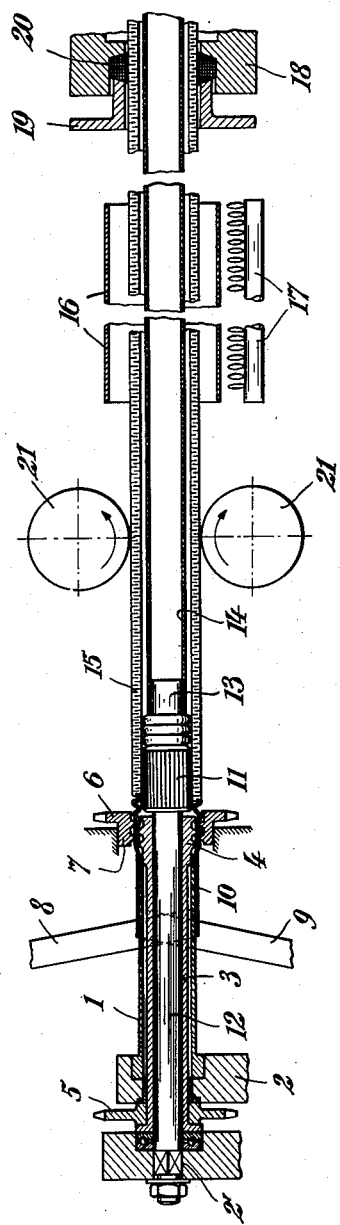

2,688,906

UNITED STATES PATENT OFFICE 2,688,906

METHOD AND MEANS FOR THE MANUFACTURE OF FLEXIBLE TUBES (PIPES)

Robert Johann Dokopil, Vienna, Austria, assignor to Vadotub Aktiengesellschaft, Vaduz, Liechtenstein Application April 27, 1951, Serial No. 223,341

Claims priority, application Austria May 9, 1950

7 Claims. (Cl. 93—80)

The present invention relates to method and means for manufacture of flexible tubes (pipes) and more particularly to method and means for the manufacture of flexible tubes (pipes) of paper or fabric, of any length from band or strip material.

An object of the present invention is to provide method and means for the manufacture of tubes (pipes) of paper or fabric of any desired length, endless so to speak, from band or strip material, which tubes (pipes) are flexible and, at the same time, pressure-resistant.

Another object of the present invention is to provide method and means for the manufacture of flexible tubes (pipes) of paper or fabric from band or strip material, by which far greater strength may be imparted to such tubes (pipes) than is possible by hitherto known methods and means.

A further object of the present invention is to improve on the art of manufacture of flexible tubes (pipes) of paper or fabric from band or strip material.

Other objects and structural details of the invention will be apparent from the following description when read in conjunction with the accompanying drawing forming part of this specification and showing, in a somewhat diagrammatical manner, by way of example, a longitudinal sectional view of a device according to the invention for the manufacture of flexible tubes from band or strip material.

In the drawing, 1 indicates a hollow winding mandrel fastened in a machine frame 2, through which mandrel passes a sleeve 3 with a threaded extension 4, this sleeve being rotatably mounted in the frame 2 and rotated by means of a sprocket 5 keyed thereto. The threaded extension 4 together with an internally threaded member 7 formed as a sprocket 6 rotated by a suitable power drive (not shown) forms the threaded socket for helically grooving the smooth tube 10 formed by winding the bands 8 and 9 on to the mandrel 1. The helical grooves on the tube 10 are pushed together in customary manner by means of a toothed collar 11 provided near the threaded socket 4, 7, this collar being provided on the projecting end of a second mandrel 12 which is inserted in the machine frame at 2′ and secured against rotation. The bands 8 and 9 fed from supply rolls, not shown in the drawing, which move round the mandrel, are wound on to the mandrel 1. A guiding tube or mandrel 14 placed over a stud 13 of the collar 11 has an external diameter somewhat smaller than the inside diameter of the tube or pipe 15 which is produced. Round the guiding tube 14 is arranged a heating channel in the form of a tube 16 of suitable length which surrounds the flexible tube or pipe 15 with ample clearance. In the embodiment illustrated, the heating of the tube 16 is effected by means of a gas burner 17, but any other kind of heating may be used. Immediately after passing through the heating channel 16 the tube 15 passes through a device or braking means which checks the feeding of the tube and therefore compresses it axially. In the embodiment shown, this braking means is formed as a stuffing-box 18 of which the axially displaceable and adjustable gland 19 presses the packing material 20 against the periphery of the tube 15 with an adjustable pressure, whereby the thrust released in an axial direction is likewise adjustable. The guiding tube or mandrel 14 holds the tube 15 straight during axial compression. The force necessary for driving the tube or pipe 15 through the braking device is applied either by the threaded socket 6, 7 alone or by additional conveying rollers 21 driven by a suitable power drive (not shown), of which rollers two or more pairs, advantageously arranged in such a way as to be displaced in relation to one another, may be provided if necessary. Any desired number of bands may be used for the manufacture of a flexible tube or pipe 15 according to the invention.

The bands may be provided with layers of hardenable synthetic material, such as phenol resins, urea resins, or the like, in a separate operation. It is particularly advantageous, however, to apply the intermediate layers of synthetic material to the bands in the tube-forming apparatus immediately before the production of the tube which is to be provided with spiral grooves as described above. The synthetic materials may be used in solid or liquid form, as powder or paste, and may be applied for instance by smearing, atomization, spraying, brushing or the like depending on their state. Since it is desirable to effect hardening as rapidly as possible, hardening accelerators known per se may be added to the synthetic material, and it is advantageous to apply the synthetic material and the hardening accelerator separately, one on each of the bands, and to bring the coating of synthetic material and the coating of hardening accelerator into contact with one another. Bands lying on the inside of the tube wall may if necessary be coated on both sides. If for instance a condensation product of urea is used as the synthetic material, then ammonium chloride, for instance, may be used as hardening accelerator.

The bands prepared in this way are formed, on the mandrel 1, into a smooth tube which is then helically grooved and pushed together longitudinally by the devices 6, 7 and 11. Immediately afterwards the tube, which in the meantime has had no opportunity of extending itself, is passed through the heating zone 16 in which it is heated and also held under axial pressure which ensures correct positioning of its spires in relation to one another and assists hardening, so that within a relatively short part of the course of the tube the layers of synthetic material are hardened to a sufficient extent to prevent the tube from changing its shape spontaneously. On leaving the braking means 18, 19, 20 the synthetic material in the tube or pipe 15 is completely hardened.

By means of the method according to the invention, the object in view, which is to produce flexible tubes of high compressive strength and of any length, can be achieved, because tests have shown that it is possible to effect hardening of the layers of synthetic material in the tube wall within a very short distance while ensuring that the moving finished tube will not extend itself. On the application of heat and of a pressure which at the same time serves to prevent the tube from changing its shape during the hardening operation, there is formed inside the tube wall a reinforcement which exercises on the curves of the meander or serpentine shape an effect like that of annular clamps and prevents subsequent spontaneous extension of the tube but can also act like arches, taking up high pressures in a direction transverse to the axis of the tube, without however impairing the flexibility of the tube.

I have described a preferred embodiment of my invention, but it is understood that this disclosure is for the purpose of illustration and that various omissions or changes in shape, proportion and arrangement of parts, as well as the substitution of equivalent elements for those herein shown and described, may be made without departing from the spirit and scope of the invention as set forth in the appended claims.

What I claim is:

1. A method for the manufacture of flexible tubes or the like of paper or fabric, of any length, from band-like material, comprising the steps of: applying intermediate layers of hardenable synthetic material to a plurality of bands, forming a smooth tube from said bands provided with intermediate layers of synthetic material, providing the smooth tube thus formed with helical grooves and pushing same together longitudinally, hardening thereafter the synthetic material by the action of heat and compressing the tube in axial direction.

2. In a method of manufacturing flexible tubing by winding strip material of paper, fabric or the like in convolutions, the steps of: building up a tube by superimposing a plurality of layers of strip material while interposing between said layers an intermediate layer of synthetic material adapted to be hardened by the action of heat and pressure, providing said tube with corrugations, and compressing the corrugated tube in axial direction thereof while simultaneously applying heat to axially compressed corrugated tube sections to thereby harden said synthetic material and firmly interconnect said layers.

3. A method according to claim 2, in which said intermediate layer of synthetic material is applied immediately prior to the production of said tube.

4. In a method of manufacturing tubing in a continuous process by winding strip material of paper, fabric or the like in convolutions, the steps of: in a continuous process building up a smooth tube by superimposing a plurality of layers of strip material while interposing between said layers a layer of resinous material adapted to be cured by the action of heat and pressure, providing the thus formed tube with corrugations while continuously advancing said smooth tube, and continuously advancing said corrugated tube while simultaneously axially compressing the same and subjecting corrugated axially compressed sections of said grooved tube to heat to thereby cure the resinous material in said sections and bond the adjacent superimposed layers together.

5. A method according to claim 4, in which the resinous material is selected from the group consisting of phenol resins and urea resins.

6. In a device for manufacturing flexible tubing by winding a plurality of superimposed layers of strip material of paper, fabric or the like in convolutions to form an ungrooved tube after interposing between said layers a layer of synthetic material adapted to be hardened by the action of heat and pressure, the combination of: a mandrel adapted to receive layers of strip material with at least one interposed layer of hardenable synthetic material and to shape the same into a tube, power operable threaded socket means arranged adjacent said mandrel and operable to provide said tube with corrugations, means operable to feed said corrugated tube away from said socket means, braking means provided in the path of said grooved tube in spaced relationship to said socket means and arranged to check the feeding of said corrugated tube to thereby bring about a compression of said tube in the direction of its longitudinal axis, and heating means interposed between said socket means and said braking means and arranged adjacent the path of said corrugated tube for heating and hardening said interposed layer to thereby hold said corrugations together.

7. A device according to claim 6, which includes power driven conveying roller means arranged between said socket means and said heating means for engagement with corrugated tube sections to aid in feeding the latter toward said braking means and thereby aiding in the axial compression of corrugated tube sections.

References Cited in the file of this patent

UNITED STATES PATENTS

| Number | Name | Date |
|---|---|---|
| 1,370,024 | Kempton | Mar. 1, 1921 |
| 1,388,467 | Keller | Aug. 23, 1921 |
| 1,921,516 | Frederick | Aug. 8, 1933 |
| 2,002,896 | Kopetz | May 28, 1935 |
| 2,033,717 | Kopetz | Mar. 10, 1936 |
| 2,343,096 | Stahl | Feb. 29, 1944 |
| 2,348,291 | Goldman | May 9, 1944 |
| 2,589,041 | Bremer | Mar. 11, 1952 |